Nov. 14, 1967  R. C. JOHNSON  3,351,986
WIRE ROPE WEDGE CLAMP
Filed June 8, 1966  2 Sheets-Sheet 1
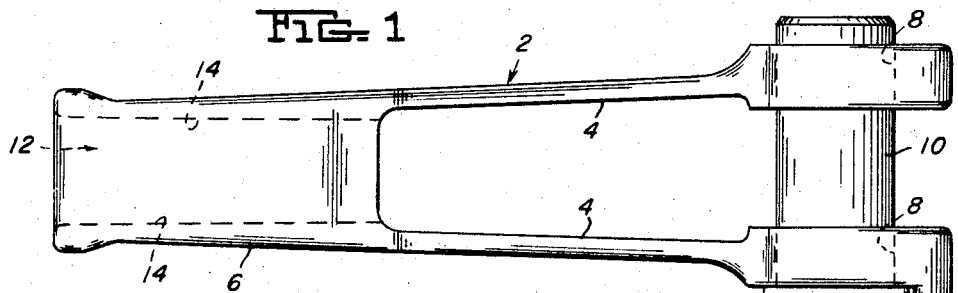
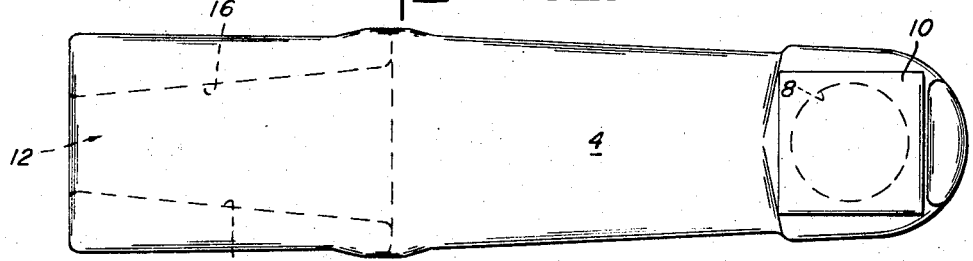
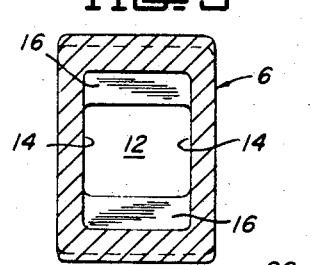
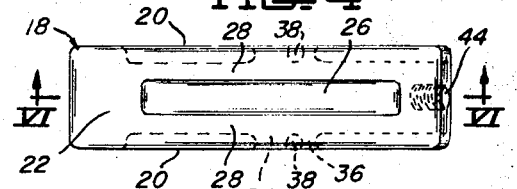
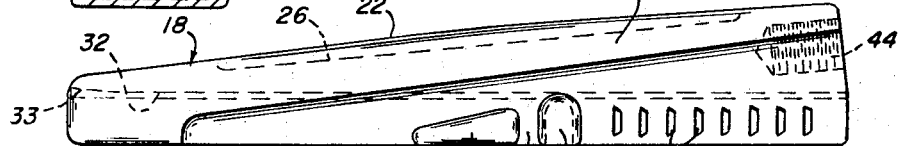
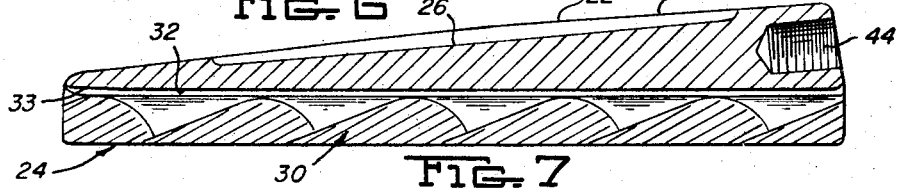
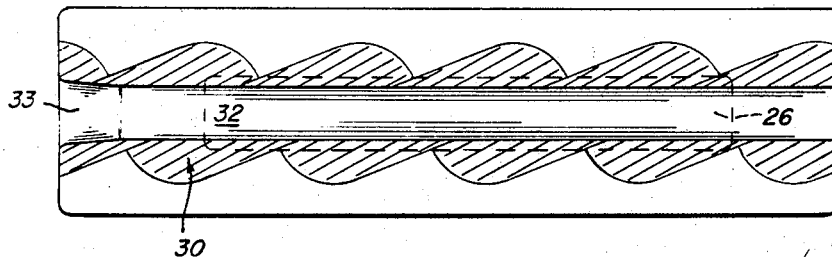
INVENTOR
RAY C. JOHNSON
By Donald G. Dalton
Attorney

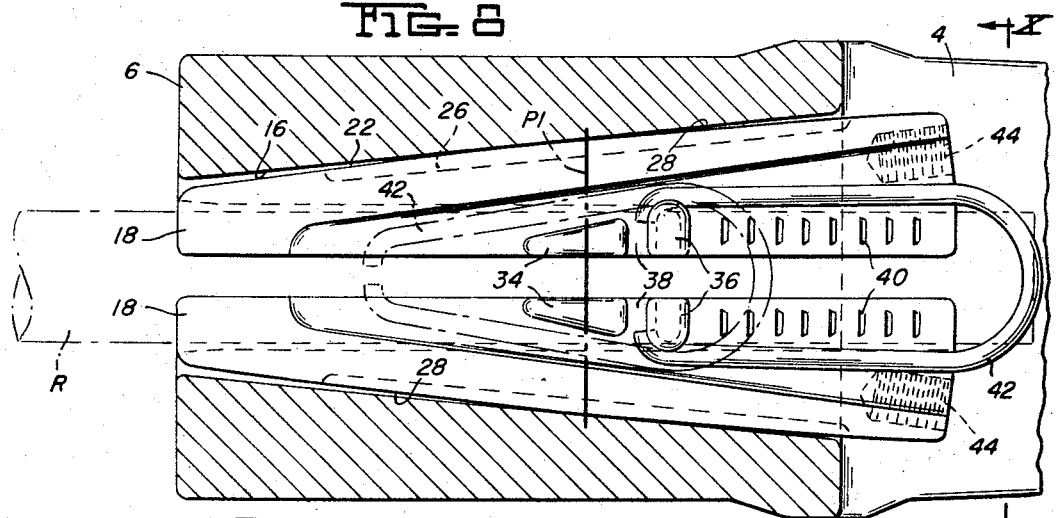
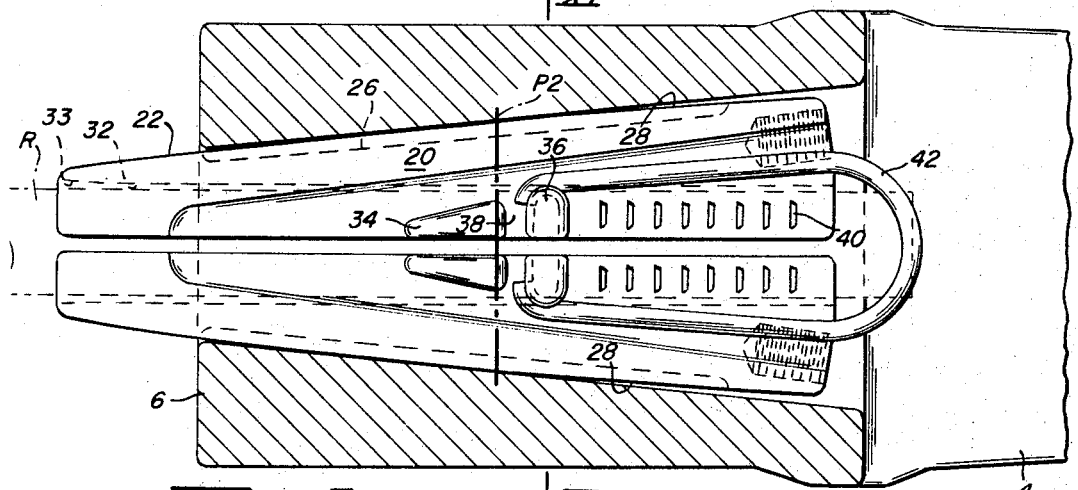
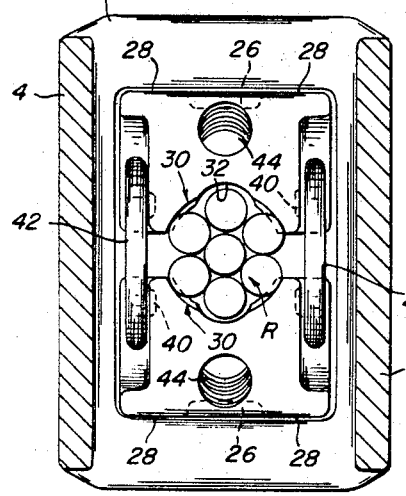
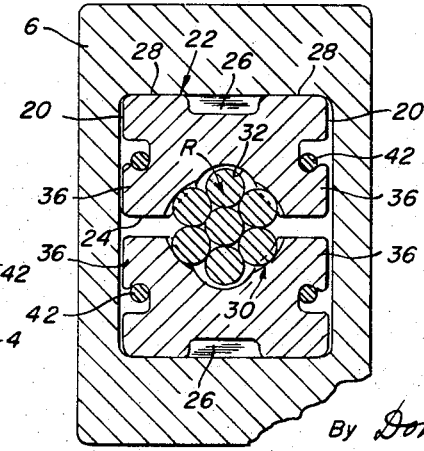

United States Patent Office 3,351,986
Patented Nov. 14, 1967

3,351,986
WIRE ROPE WEDGE CLAMP
Ray C. Johnson, Holden, Mass., assignor to United States Steel Corporation, a corporation of Delaware
Filed June 8, 1966, Ser. No. 556,231
9 Claims. (Cl. 24—126)

This invention relates to a wire rope fitting and more particularly to a fitting of the socket type for detachable connection to a wire rope. Some socket type fittings are constructed so that the wire rope is permanently or semi-permanently attached to the fitting. However, there are many applications where the rope will become worn or break in the field and it is necessary to construct the fitting in such a manner that the wire rope can be removed in the field and a new rope secured thereto. It is to this type of fitting that my invention relates. Prior fittings of which I have knowledge are extremely heavy and hard to handle, their holding power is relatively low, they distort the rope, and/or require considerable rope to make the connection. For example, a construction somewhat similar to that shown in Crosland Patent No. 1,029,345 dated June 11, 1912, may be used with the rope end being in the form of a loop so that two parallel lengths of rope are secured in the fitting.

It is therefore an object of my invention to provide a fitting which is lighter and more efficient than the prior fittings.

Another object is to provide such a fitting which will cause less distortion of the wire rope.

Still another object is to provide such a fitting which requires less rope to form the connection.

These and other objects will be more apparent after referring to the following specification and attached drawings, in which:

FIGURE 1 is a plan view of the socket of my invention;
FIGURE 2 is a side view of the socket of FIGURE 1;
FIGURE 3 is a view taken on the line III—III of FIGURE 2;
FIGURE 4 is a top plan view of one of the gripping jaws of my invention;
FIGURE 5 is an enlarged side view of the jaw of FIGURE 4;
FIGURE 6 is an enlarged view taken on the line VI—VI of FIGURE 4;
FIGURE 7 is a bottom plan view showing the rope gripping surface of the jaw of FIGURE 6;
FIGURE 8 is a sectional view of the fitting with a rope and jaws in initial position;
FIGURE 9 is a view, similar to FIGURE 8, showing the rope and jaws in final position after the application of a large rope force;
FIGURE 10 is a view taken on the line X—X of FIGURE 8; and
FIGURE 11 is a view taken on the line XI—XI of FIGURE 9.

Referring more particularly to the drawings, reference numeral 2 indicates a socket type fitting having a pair of webs 4 connected to a basket portion 6. Each of the webs 4 has an opening 8 therein for receiving a pin 10 which connects the fitting to the equipment with which it is used. The basket portion 6 has an axial opening 12 therethrough of rectangular cross section. The opening 12 has opposed parallel sides 14 and opposed tapered sides 16 which diverge from the entry end of the opening. It will be noted that the walls forming the parallel sides of the opening are considerably thinner than the other two sides, this resulting in maximum strength per unit of weight. A pair of rope gripping jaws 18 are received in the opening 12. Each jaw 18 has opposed parallel sides 20, a tapered side 22, and a grooved side 24. The side 22 has a central longitudinal relieved portion 26 with a land 28 on each side thereof. This construction reduces bending stresses in the thick wall of the socket basket and thereby minimizes the thickness required for a safe design. The lands 28 have an arcuate, convex longitudinal outer surface which engages one of the tapered sides 16 of opening 12. The longitudinal groove in the side 24 has spiral channels 30 therein, which match the outer contour of rope R, and a longitudinal relief channel 32 in the bottom thereof. Also, it is preferable that the entry end of side 24 have a bell shape 33 to reduce pinching of the rope in a critical stress region. Each jaw 18 is preferably provided with spaced projections 34 and 36 forming a groove 38 therebetween and with a washboard surface 40 extending from projection 36 to the exit end of the jaw. A spring 42 has its ends received in the grooves 38 in the opposed jaws. For the purpose of removing the jaws it is preferred that a threaded hole 44 be provided in the exit end thereof.

To connect the wire rope R to the fitting, the jaws 18 are placed in the opening 12 around the rope R with the rope fitting snugly in the spiral channels 30. The two load springs 42 are pried in place from the broken line position of FIGURE 8 by using a screwdriver or crowbar on the washboard surface 40. The rope with the jaws 18 thereon is firmly seated in the opening 12 in the basket portion, but before application of an appreciable force on the rope. At this time, the entry end of the jaws are aligned with the entry end of the basket portion as shown in FIGURE 8 with the center of pressure being at point P1. Tension is then applied to the rope R which is resisted by the pin 10, thus moving the jaws 18 forwardly to the position shown in FIGURE 9. At this time the center of pressure will be at point P2. By providing the relief grooves 32, the total gripping force on the rope is increased with more uniform loading around the rope periphery so that deformation of the rope is minimized. The convex curved surface of the lands 28, as shown in FIGURES 8 and 9, accommodates small manufacturing errors which are unavoidable so as to maintain the pressure points P1 and P2 close to the proper location. The use of plain surfaces for both the socket basket walls and the outer jaw surfaces would result in a concentration of pressure at one end of the basket and thus require a heavier fitting. It will be seen that only a small length of rope R is required to fasten it to the fitting. When it is necessary to replace the rope a pulling device, not shown, is threaded into the holes 44 in the jaws 18 in order to obtain sufficient force to move the jaws toward the pin 10.

While one embodiment of my invention has been shown and described, it will be apparent that other adaptations and modifications may be made without departing from the scope of the following claims.

I claim:

1. A wire rope fitting comprising a socket having a basket portion at the entry end thereof, said basket portion having an axial opening therethrough of rectangular cross-section, said opening having two opposed parallel sides and two opposed tapered sides diverging from the entry end thereof, and a pair of rope gripping jaws in said opening each having two parallel sides and a tapered side, said tapered side of each jaw having a central longitudinal relieved portion with a land on each side thereof adapted to engage one of the tapered sides of said opening, the side of said jaw opposite its tapered side having a longitudinal groove therein for receiving said wire rope, said longitudinal groove having spiral channels therein matching the outer contour of said rope.

2. A wire rope fitting according to claim 1 in which said lands have an arcuate convex longitudinal outer surface.

3. A wire rope fitting according to claim 1 in which the walls of said basket portion forming the parallel sides of its opening are thinner than the other two sides.

4. A wire rope fitting according to claim 3 in which said lands have an arcuate convex longitudinal outer surface.

5. A wire rope fitting according to claim 1 including a longitudinal relief channel in the bottom of said jaw groove.

6. A wire rope fitting according to claim 5 in which said lands have an arcuate convex longitudinal outer surface.

7. A wire rope fitting according to claim 5 in which the walls of said basket portion forming the parallel sides of its opening are thinner than the other two sides.

8. A wire rope fitting according to claim 7 in which said lands have an arcuate convex longitudinal outer surface.

9. A wire rope fitting comprising a socket having a basket portion at the entry end thereof, said basket portion having an axial opening therethrough of rectangular cross-section, said opening having two opposed parallel sides and two opposed tapered sides diverging from the entry end thereof, and a pair of rope gripping jaws in said opening each having two parallel sides and a tapered side adapted to engage one of the tapered sides of said opening, the side of said jaw opposite its tapered side having a longitudinal groove therein for receiving said wire rope, said longitudinal groove having spiral channels therein matching the outer contour of said rope and a longitudinal relief channel in the bottom of said groove.

References Cited

UNITED STATES PATENTS

| | | | |
|---|---|---|---|
| 1,622,109 | 3/1927 | Haworth | 24—126 |
| 2,441,304 | 5/1948 | West | 24—126 X |
| 2,848,776 | 8/1958 | Campbell | 24—126 |

BERNARD A. GELAK, *Primary Examiner.*